(12) United States Patent
Kuroda et al.

(10) Patent No.: US 12,119,490 B2
(45) Date of Patent: Oct. 15, 2024

(54) POSITIVE ELECTRODE ACTIVE MATERIAL AND SECONDARY BATTERY

(71) Applicant: Panasonic Intellectual Property Management Co., Ltd., Osaka (JP)

(72) Inventors: Kosuke Kuroda, Kyoto (JP); Hiroshi Kawada, Hyogo (JP); Atsushi Fukui, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 716 days.

(21) Appl. No.: 17/263,670

(22) PCT Filed: Feb. 21, 2019

(86) PCT No.: PCT/JP2019/006652
§ 371 (c)(1),
(2) Date: Jan. 27, 2021

(87) PCT Pub. No.: WO2020/026487
PCT Pub. Date: Feb. 6, 2020

(65) Prior Publication Data
US 2021/0296646 A1    Sep. 23, 2021

(30) Foreign Application Priority Data
Jul. 31, 2018 (JP) .................. 2018-144196

(51) Int. Cl.
*H01M 4/505* (2010.01)
*C01G 53/00* (2006.01)
(Continued)

(52) U.S. Cl.
CPC ............ *H01M 4/525* (2013.01); *C01G 53/42* (2013.01); *H01M 4/364* (2013.01); *H01M 4/366* (2013.01);
(Continued)

(58) Field of Classification Search
CPC ...... H01M 4/525; H01M 4/364; H01M 4/505; H01M 4/582; H01M 10/0525;
(Continued)

(56) References Cited

U.S. PATENT DOCUMENTS

| 5,817,436 A | 10/1998 | Nishijima et al. | |
| 2005/0118496 A1* | 6/2005 | Chang | H01M 4/366 |
| | | | 429/231.1 |

(Continued)

FOREIGN PATENT DOCUMENTS

| CN | 102569878 A | 7/2012 |
| CN | 107431201 A | 12/2017 |

(Continued)

OTHER PUBLICATIONS

Decision of JPO to grant a Patent for Application JP 2020-534043 (Year: 2020).*
International Search Report dated May 21, 2019, issued in counterpart Application No. PCT/JP2019/006652. (2 Pages).
English Translation of Search Report dated Nov. 24, 2023 issued in counterpart CN Application No. 201980042648.6. (3 pages).

*Primary Examiner* — Alexander Usyatinsky
(74) *Attorney, Agent, or Firm* — WHDA, LLP

(57) ABSTRACT

Provided is a positive electrode active material including a first lithium oxide represented by $Li_{2+x}Ni_{1-y}A^1_yO_{2-z}A^2_z$, where $-0.5 \leq x \leq 0.3$, $0 \leq y \leq 0.1$, and $0 \leq z \leq 0.3$. Here, at least one of y and z is not 0. $A^1$ includes at least one selected from the group consisting of Ga, Bi, Ba, Y, Sn, Ca, W, and Ta. $A^2$ includes at least one selected from the group consisting of halogen elements and S.

12 Claims, 1 Drawing Sheet

(51) Int. Cl.
*H01M 4/36* (2006.01)
*H01M 4/525* (2010.01)
*H01M 4/58* (2010.01)
*H01M 10/0525* (2010.01)
*H01M 4/02* (2006.01)

(52) U.S. Cl.
CPC ........... *H01M 4/505* (2013.01); *H01M 4/582* (2013.01); *H01M 10/0525* (2013.01); *C01P 2002/54* (2013.01); *C01P 2004/80* (2013.01); *C01P 2006/40* (2013.01); *H01M 2004/028* (2013.01)

(58) Field of Classification Search
CPC .............. H01M 2004/028; C01G 53/42; C01P 2002/54; C01P 2004/80; C01P 2006/40
See application file for complete search history.

(56) References Cited

U.S. PATENT DOCUMENTS

| | | | | |
|---|---|---|---|---|
| 2012/0164533 | A1* | 6/2012 | Senoue | H01M 4/525 429/219 |
| 2015/0340692 | A1 | 11/2015 | Park et al. | |
| 2018/0090747 | A1* | 3/2018 | Natsui | C01G 51/006 |

FOREIGN PATENT DOCUMENTS

| | | |
|---|---|---|
| JP | 2000-128539 A | 5/2000 |
| JP | 3403568 B2 | 5/2003 |
| JP | 2012-142156 A | 7/2012 |
| JP | 2015-536541 A | 12/2015 |
| KR | 20150079362 A | 7/2015 |
| KR | 20150079362 * | 8/2015 |
| WO | 2017/013848 A1 | 1/2017 |
| WO | WO 2017/013848 * | 1/2017 |

* cited by examiner

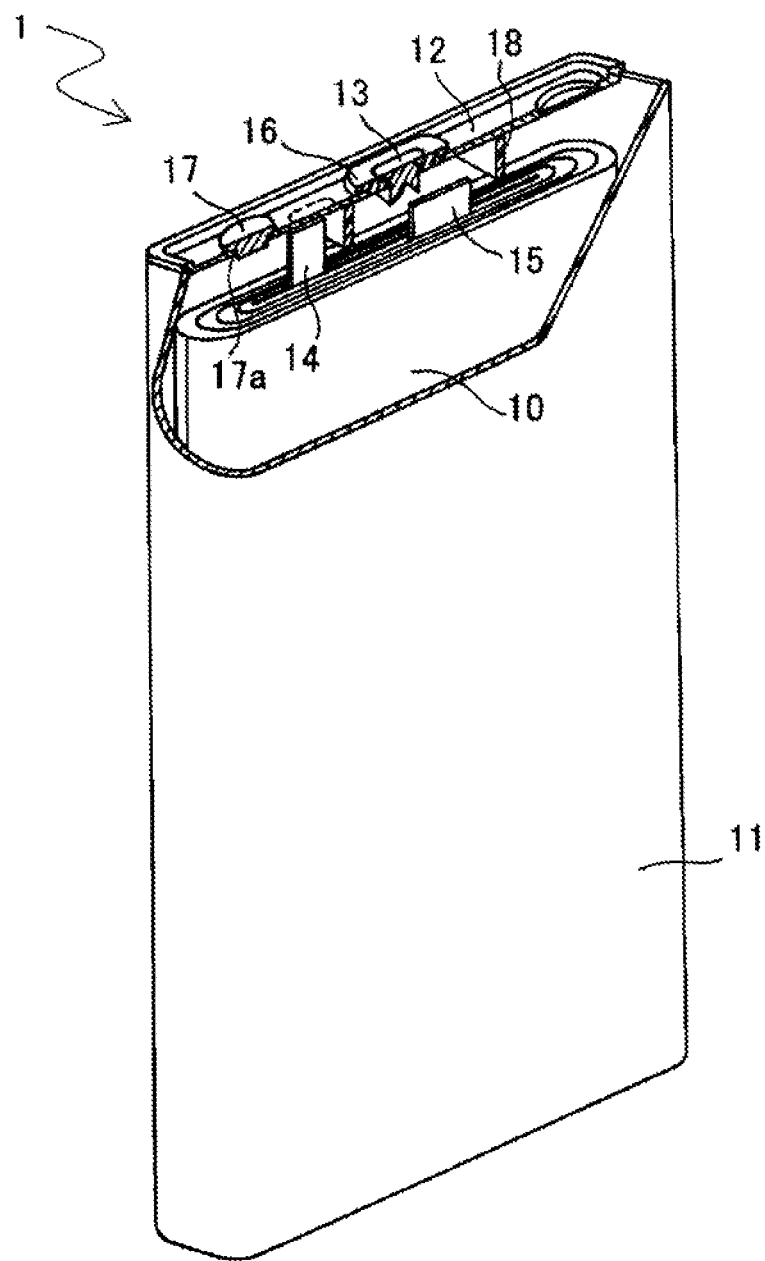

POSITIVE ELECTRODE ACTIVE MATERIAL AND SECONDARY BATTERY

TECHNICAL FIELD

The present disclosure relates to a positive electrode active material for secondary batteries, and a secondary battery.

BACKGROUND ART $Li_2NiO_2$ is known as a positive electrode active material being used in a lithium ion battery and having a high theoretical capacity (e.g., see Patent Literature 1). $Li_2NiO_2$ contains 2 moles of Li per one mole of Ni. When $Li_2NiO_2$ is used as a positive electrode active material, its theoretical capacity reaches as high as approximately 550 mA/g.

CITATION LIST

Patent Literature

[PTL 1] Japanese Patent No. 3403568

SUMMARY OF INVENTION

Technical Problem

A lithium ion battery including $Li_2NiO_2$, however, shows a decline in charge capacity because of the low electrochemical activity of $Li_2NiO_2$, which has been an obstacle in achieving a high capacity lithium ion battery.

Solution to Problem

One aspect of the present disclosure relates to a positive electrode active material for secondary batteries, the positive electrode active material including a first lithium oxide represented by a composition formula (I): $Li_{2+x}Ni_{1-y}A^1_yO_{2-z}A^2_z$, where $-0.5 \leq x \leq 0.3$, $0 \leq y \leq 0.1$, and $0 \leq z \leq 0.3$, at least one of y and z being not 0, $A^2$ including at least one selected from the group consisting of Ga, Bi, Ba, Y, Sn, Ca, W, and Ta, $A^2$ including at least one selected from the group consisting of halogen elements and S.

Another aspect of the present disclosure relates to a secondary battery including a positive electrode, a negative electrode, and an electrolyte, the positive electrode including the positive electrode active material according to the above one aspect.

Advantageous Effects of Invention

With the positive electrode active material of the present disclosure, a high-capacity secondary battery can be achieved.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF DRAWING

FIG. 1 A partially cut-away oblique view of the secondary battery according to one embodiment of the present disclosure.

DESCRIPTION OF EMBODIMENTS

A positive electrode active material according to an embodiment of the present disclosure is for secondary batteries and includes a first lithium oxide represented by $Li_{2+x}Ni_{1-y}A^1_yO_{2-z}A^2_z$, where $-0.5 \leq x \leq 0.3$, $0 \leq y \leq 0.1$, and $0 \leq z \leq 0.3$. At least one of y and z is not 0. $A^1$ includes at least one selected from the group consisting of Ga, Bi, Ba, Y, Sn, Ca, W, and Ta. $A^2$ includes at least one selected from the group consisting of halogen elements and S. Among halogen elements, F and Cl are preferred.

$Li_2NiO_2$ has a crystal structure belonging to the space group Immm. In $Li_2NiO_2$, Ni is planarly coordinated with four surrounding oxygen atoms, forming a cluster of $NiO_4$ having a planar tetracoordinate structure. Adjacent $NiO_4$ clusters are linked so as to share two O atoms on the same plane, forming a planar one-dimensional straight chain having a $NiO_2$ composition. The straight chains of $NiO_2$ are stacked such that their planes become parallel one another, forming a layered structure. Li is present between the $NiO_2$ one-dimensional straight chains in the layered structure. Specifically, Li is coordinated with two oxygen atoms at the side end of the $NiO_2$ one-dimensional straight chain, and each one of the oxygen atoms of the $NiO_2$ one-dimensional straight chains in the upper layer and in the lower layer, being tetrahedrally coordinated with 0 atoms.

The first lithium oxide is based on $Li_2NiO_2$, with some of the nickel atoms in $Li_2NiO_2$ replaced with an element $A^1$, and/or some of the oxygen atoms in $Li_2NiO_2$ replaced with an element $A^2$. Therefore, by using the first lithium oxide for positive electrode active material, the initial charge capacity can be improved.

When the Ni site in $Li_2NiO_2$ is substituted by the element $A^1$, or the O site is substituted by the element $A^2$, a strain occurs around the substituted element. The strain inhibits the growth of crystals, which reduces the crystallite size. As the crystallite size is reduced, the Li diffusion distance becomes shorter, and the active spots of reaction increase, which increases the charge capacity.

The positive electrode material may include LiF. LiF can cover the surface of the first lithium oxide serving as the positive electrode active material. This can protect the first lithium oxide from a reaction with an electrolyte component and thereby can suppress a side reaction of the first lithium oxide with the electrolyte component. In this case, LiF is preferably localized on the surface of the first lithium oxide.

The first lithium oxide can be synthesized by a solid-phase technique by, for example, mixing lithium oxide ($Li_2O$), nickel(II) oxide (NiO), and a material containing the element $A^1$ and/or element $A^2$, and baking the mixture in an oxygen-free atmosphere. In the case of containing fluorine as the element $A^2$ in the first lithium oxide, LiF may be added to the mixture to be baked. In this case, depending on the baking conditions and the amount of LiF added, fluorine not solid-dissolved in $Li_2NiO_2$ may deposit in a form of LiF. In this case, LiF is possibly formed so as to cover the surface of the crystals of the first lithium oxide. The content of LiF is preferably 10% or less, more preferable 6% or less. Here, the content of LiF refers to R=Ny/(Nx+Ny), where Nx is a total of the number of Ni atoms and the number of $A^1$ atoms contained in the first lithium oxide $Li_{2+x}Ni_{1-y}A^1_yO_{2-z}A^2_z$, and Ny is the number of F atoms contained in LiF.

The first lithium oxide can be used in combination with another positive electrode active material capable of releasing lithium ions. An example of such another positive electrode active material is a second lithium oxide represented by $Li_aM^1O_2$, where $0.95 \leq a \leq 1.2$. Here, $M^1$ includes at least one selected from the group consisting of Ni, Mn, and Co.

The second lithium oxide has a small irreversible capacity and is excellent in initial efficiency. By using the first and second lithium oxides in combination, a positive electrode material which exhibits a high initial capacity and high capacity maintained even after repeated charge-discharge cycles can be obtained.

Preferably, the second lithium oxide is represented by $Li_aNi_bCo_cM^2_{1-b-c}O_2$, where $0.95 \leq a \leq 1.2$, $0.3 \leq b \leq 0.95$, $0<c \leq 0.5$, and $b+c<1$. $M^2$ includes at least one selected from the group consisting of Mn and Al. The operating voltage of the second lithium oxide shows a value close to that of the first lithium oxide. The second lithium oxide therefore is suitable for using in combination with the first lithium oxide, to form a positive electrode active material. The second lithium oxide is not limited to one kind, and two or more kinds thereof may be included in the active material.

When the positive electrode active material includes the second lithium oxide, the proportion of the first lithium oxide in the positive electrode active material as a whole is preferably 1 to 20 mass %. By mixing the first lithium oxide and the second lithium oxide in the range above, the initial capacity of the positive electrode active material as a whole can be increased, and the reduction in capacity due to repeated charge and discharge can be suppressed.

For a negative electrode active material, any conventional material used for lithium ion secondary batteries can be used. In particular, the negative electrode active material preferably includes an alloy-type material containing at least one element selected from the group comprising Si, Sn, Ga, and In. Examples of the alloy-type material containing Si include silicon simple substance, a silicon alloy, and a silicon compound. Examples of the alloy-type material containing Sn include tin simple substance, a tin alloy, and a tin compound. Examples of the alloy-type material containing Ga or In include a Ga alloy and an In alloy. The silicon compound and the tin compound are each exemplified by an oxide and/or a nitride. Among the alloy-type materials containing Si, preferred are $SiO_x$, where $0.5 \leq x<2.0$, and lithium silicate composite particles. Here, $SiO_x$ is composite particles in which monocrystalline silicon phases are dispersed in the $SiO_2$ phase. The lithium silicate composite particles are composite particles in which monocrystalline silicon is dispersed in the lithium silicate phase ($Li_{2x}SiO_{2+x}$, where $0<x<2$).

These alloy-type materials are low in initial efficiency and contain a large number of lithium ions that are to be captured irreversibly during the initial charge and fail to contribute to the capacity in the later charge and discharge. However, when the positive electrode active material includes the first lithium oxide, the irreversible capacity of the negative electrode can be offset by the irreversible capacity of the positive electrode. In other words, the lithium ions consumed irreversibly at the negative electrode can be compensated for by the lithium ions emitted irreversibly from the first lithium oxide. In this way, a secondary battery in which the reduction in capacity is suppressed in the charge-discharge cycles after the initial charge and discharge can be obtained.

The positive electrode material may partially have an amorphous phase mainly composed of $Li_{1+x}Ni_{1-y}A^1_yO_{2-z}A^2_z$. Lithium ions are desorbed during the first charge from the first lithium oxide, and an amorphous phase transformed from the first lithium oxide can be introduced into the positive electrode material. The amorphous phase may be mainly composed of $Li_{1+x}Ni_{1-y}A^1_yO_{2-z}A^2_z$. The amorphous phase has low reactivity, and on the surface thereof, electrolyte decomposition and gas generation are unlikely to occur.

The amorphous phase mainly composed of $Li_{1+x}Ni_{1-y}A^1_yO_{2-z}A^2_z$ refers to a state in which, for example, a half width w of a diffraction peak corresponding to the (101) plane of the first lithium oxide obtained by X-ray diffractometry satisfies $w>0.5°$. In view of enhancing the effect of the amorphous phase, such as suppressing electrolyte decomposition, $w>1.5°$ is preferred.

Moreover, in the positive electrode active material including the first and second lithium oxides, when a half width of a diffraction peak corresponding to the (101) plane of the first lithium oxide obtained by X-ray diffractometry is 7 times or more as large as a half width of a highest intensity diffraction peak of the second lithium oxide, the positive electrode material can be regarded as partially having an amorphous phase mainly composed of $Li_{1+x}Ni_{1-y}A^1_yO_{2-z}A^2_z$. In view of enhancing the effect of the amorphous phase, such as suppressing electrolyte decomposition, the aforementioned half width of the first lithium oxide is preferably 10 times or more as large as the half width of the highest intensity diffraction peak of the second lithium oxide.

In the present disclosure, the method of X-ray diffractometry and the data analysis conditions are, for example, as follows.

Measuring instrument: Desktop X-ray diffractometry instrument MiniFlex, available from Rigaku Corporation Analysis software: Integrated X-ray powder diffraction software PDXL, available from Rigaku Corporation Measuring conditions: 10° to 80°

Counter cathode: Cu-Kα

Tube voltage: 40 kV

Tube current: 10 mA

Count time: 0.5 seconds

Divergence slit: 1.25°

Scattering slit: 8.0 mm

Light receiving slit: 13.0 mm

Peaks used for analysis: a diffraction peak (2θ=25 to 26°) corresponding to the (101) plane of the first lithium oxide, and a highest intensity diffraction peak of the second lithium oxide.

FIG. 1 is a schematic oblique view of a secondary battery according to one embodiment of the present disclosure. In FIG. 1, a secondary battery 1 is partially cut away, to show the configuration of the essential part thereof.

The secondary battery 1 includes a positive electrode, a negative electrode including a negative electrode material, and an electrolyte. The positive electrode includes a positive electrode material including the aforementioned first lithium oxide.

In the illustrated example of FIG. 1, the positive electrode and the negative electrode are wound with a separator interposed therebetween, forming a flat wound electrode group 10. The electrode group 10 is housed together with the electrolyte (not shown) in a prismatic battery case 11, being completed as a prismatic wound battery. It is noted, however, in the present disclosure, the type, shape, and the like of the secondary battery is not particularly limited.

To a positive electrode current collector of the positive electrode included in the electrode group 10, one end of a positive electrode lead 14 is connected. The other end of the positive electrode lead 14 is connected to a sealing plate 12 serving as a positive electrode terminal. To a negative electrode current collector, one end of a negative electrode lead 15 is connected, and the other end of the negative electrode lead 15 is connected to a negative electrode terminal 13 provided approximately at the center of the sealing plate 12. Between the sealing plate 12 and the negative electrode terminal 13, a gasket 16 is placed, providing electrical insulation therebetween. Between the sealing plate 12 and the electrode group 10, a frame member 18 formed of an electrically insulating material is placed, providing electrical insulation between the negative electrode lead 15 and the sealing plate 12. The sealing plate 12 is attached to the battery case 11 at its open end, sealing the prismatic battery case 1. The sealing plate 12 is provided with an injection hole 17$a$. The electrolyte is injected through the injection hole 17$a$ into the prismatic battery case 11. Thereafter, the injection hole 17$a$ is closed with a sealing stopper 17.

(Positive Electrode)

The positive electrode includes a positive electrode current collector and a positive electrode material layer provided on a surface of the positive electrode current collector. The positive electrode current collector is in the form of sheet. The positive electrode material layer includes a positive electrode active material. The positive electrode material layer may be formed on one surface or both surfaces of the sheet-form positive electrode current collector.

(Positive Electrode Current Collector)

The positive electrode current collector is in the form of, for example, metal foil or metal sheet. The positive electrode current collector may be made of, for example, stainless steel, aluminum, an aluminum alloy, or titanium. The thickness of the positive electrode current collector can be selected from the range of, for example, 3 to 50 sm.

(Positive Electrode Material Layer)

A description will be given below of a case where the positive electrode material layer comprises a mixture (mixed material) including positive electrode active material particles. The positive electrode material layer essentially contains a positive electrode active material and a binder, and may optionally contain an electrically conductive material. The binder is contained in the positive electrode material layer in an amount of preferably 0.1 to 20 parts by mass, more preferably 1 to 5 parts by mass, relative to 100 parts by mass of the positive electrode active material. The positive electrode material layer has a thickness of, for example, 10 to 100 μm.

The positive electrode active material includes the aforementioned first lithium oxide. The first lithium oxide may be used in combination with another known positive electrode material having a function of absorbing and releasing lithium ions. A preferable example of such a positive electrode material is, but not limited to, a lithium-containing transition metal oxide. Examples of the transition metal element include Sc, Y, Mn, Fe, Co, Ni, Cu, Cr, Zr, and W. Preferred among them are Ni, Co, Mn, Fe, Cu, and Cr, and more preferred are Mn, Co, and Ni. The lithium-containing transition metal oxide is preferably a lithium-nickel composite oxide containing Li, Ni, and one or more other metals, in view of achieving a high capacity.

The lithium-containing transition metal oxide may contain, if necessary, one kind or two or more kinds of typical metal elements. Examples of the typical metal elements include Mg, Al, Ca, Zn, Ga. Ge, Sn, Sb, Pb, and Bi. The typical metal element is preferably Al or the like.

The lithium-containing transition metal oxide may have any crystal structure, but preferably has a structure belonging to the space group R-3m. Such a positive electrode active material exhibits relatively small expansion and contraction in its lattice during charge and discharge, and therefore, is unlikely to degrade even used with a non-aqueous electrolyte, which is effective in achieving excellent cycle characteristics. The positive electrode active material belonging to the space group R-3m may be the aforementioned second lithium oxide, that is, may contain, Ni, Co, and Mn and/or Al. In such a positive electrode active material, the content of Ni in the total of Ni, Co, Mn, and Al may be 50 atom % or more. For example, when the positive electrode active material contains Ni, Co, and Al, the content of Ni may be 50 atom % or more, and may be 80 atom % or more. When the positive electrode active material contains Ni, Co, and Mn, the content of Ni may be 50 atom % or more.

In the lithium-containing transition metal oxide (second lithium oxide) used in combination with the first lithium oxide, in view of achieving a high capacity, the content of Ni in $M^1$ preferably satisfies $0.85 \leq b \leq 1$. In view of the stability of the crystal structure, preferred is $Li_aNi_bCo_cAl_dO_2$ containing Ni, Co, and Al as elements represented by $M^1$, where $0.95 \leq a \leq 1.2$, $0.85 \leq b \leq 1$, $0 < c < 0.15$, $0 < d \leq 0.1$, and $b+c+d=1$.

Examples of the lithium-containing transition metal oxide (second lithium oxide) include a lithium-nickel-cobalt-manganese composite oxide (e.g., $LiNi_{0.5}Co_{0.2}Mn_{0.3}O_2$, $LiNi_{1/3}Co_{1/3}Mn_{1/3}O_2$, $LiNi_{0.4}Co_{0.2}Mn_{0.4}O_2$), a lithium-nickel-cobalt composite oxide (e.g., $LiNi_{0.8}Co_{0.2}O_2$), and a lithium-nickel-cobalt-aluminum composite oxide (e.g., $LiNi_{0.8}Co_{0.15}Al_{0.05}O_2$, $LiNi_{0.8}Co_{0.18}Al_{0.02}O_2$, $LiNi_{0.88}Co_{0.09}Al_{0.03}O_2$).

When the positive electrode active material includes the first lithium oxide and the second lithium oxide, the proportion of the first lithium oxide in the positive electrode active material as a whole is, for example, 1 to 20 mass %.

In view of enhancing the packability of the positive electrode active material in the positive electrode material layer, the positive electrode active material particles desirably have an average particle diameter (D50) which is small enough with respect to the thickness of the positive electrode material layer. The average particle diameter (D50) of the positive electrode active material particles is, for example, preferably 5 to 30 μm, more preferably 10 to 25 μm. The average particle diameter (D50) herein means a median diameter at 50% cumulative volume in a volumetric particle size distribution. The average particle diameter can be measured by, for example, using a laser diffraction/scattering type particle size distribution analyzer.

Examples of the binder include: fluorocarbon resin, such as polyvinylidene fluoride (PVdF), polytetrafluoroethylene (PTFE), and tetrafluoroethylene-hexafluoropropylene (HFP) copolymer; acrylic resin, such as polymethyl acrylate and ethylene-methyl methacrylate copolymer; rubbery materials, such as styrene-butadiene rubber (SBR) and acrylic rubber; and water-soluble polymers, such as carboxymethyl cellulose (CMC) and polyvinylpyrrolidone.

The conductive material is preferably a carbon black, such as acetylene black or Ketjen black.

The positive electrode material layer can be formed by mixing positive electrode active material particles, a binder, and the like with a dispersion medium, to prepare a positive electrode slurry, applying the positive electrode slurry onto a surface of a positive electrode current collector, drying the slurry, and then rolling. Examples of the dispersion medium include water, alcohols such as ethanol, ethers such as tetrahydrofuran, and N-methyl-2-pyrrolidone (NMP). Wien the dispersion medium is water, the binder is preferably a combination of a water-soluble polymer and a rubbery material.

(Negative Electrode)

The negative electrode includes a negative electrode current collector and a negative electrode material layer provided on a surface of the negative electrode current collector. The negative electrode current collector is in the form of sheet. The negative electrode material layer includes a negative electrode active material. The negative electrode material layer may be formed on one surface or both surfaces of the sheet form of the negative electrode current collector.

(Negative Electrode Current Collector)

Examples of the negative electrode current collector include a metal foil, a metal sheet, a mesh metal, a punched sheet metal, and an expanded metal. The negative electrode current collector may be made of, for example, stainless steel, nickel, copper, or a copper alloy. The thickness of the negative electrode current collector can be selected from the range of, for example, 3 to 50 μm.

(Negative Electrode Material Layer)

The negative electrode material layer can be formed in a similarly manner to the positive electrode material layer, using a negative electrode slurry including a negative electrode active material, a binder, and a dispersion medium. The negative electrode material layer may contain, if necessary, an optional component, such as an electrically conductive material. The amount of the binder contained in the negative electrode material layer is preferably 0.1 to 20 parts by mass, more preferably 1 to 5 parts by mass, relative to 100 parts by mass of the negative electrode material layer. The negative electrode material layer has a thickness of, for example, 10 to 100 μm.

The negative electrode active material may be either a non-carbonaceous material or a carbon material, or a combination of them. The carbon material used as the negative electrode active material is not particularly limited, but is preferably, for example, at least one selected from the group consisting of graphite and hard carbon. Among them, graphite is more preferred because of its high capacity and small irreversible capacity.

Graphite is the collective name for carbon materials having a graphite structure and includes natural graphite, artificial graphite, expandable graphite, and graphitized mesophase carbon particles. Examples of the natural graphite include flake graphite and amorphous graphite. Usually, a carbon material having an interplanar spacing $d_{002}$ of the (002) plane of the graphite structure of 3.35 to 3.44 angstrom as calculated from its X-ray diffraction spectrum is classified as graphite. On the other hand, hard carbon is a carbon material in which tiny graphite crystals are arranged in random directions, and further graphitization hardly proceeds, and which has an interplanar spacing $d_{002}$ of the (002) plane of greater than 3.44 angstrom.

The non-carbonaceous material used as the negative electrode active material is preferably an alloy-type material. The alloy-type material preferably contains at least one selected from silicon, tin, Ga, and In, and is preferably silicon simple substance or a silicon compound. The silicon compound encompasses a silicon oxide and a silicon alloy.

The negative electrode active material may be metal lithium or a lithium alloy.

(Separator)

The separator may be, for example, a microporous film, nonwoven fabric, or woven fabric made of a resin. Examples of the resin include polyolefins, such as polyethylene (PE) and polypropylene (PP), polyamides, and polyamide-imides.

(Electrolyte)

The electrolyte includes a solvent and a solute dissolved in the solvent. The solute may be selected from various lithium salts. The lithium salt concentration in the electrolyte is, for example, 0.5 to 2 mol/L. The electrolyte may contain one or more known additives.

The solvent may be, for example, a non-aqueous solvent, such as cyclic carbonic ester, chain carbonic ester, cyclic carboxylic acid ester, or chain carboxylic acid ester, or water.

Examples of the cyclic carbonic ester include ethylene carbonate (EC), fluoroethylene carbonate (FEC), propylene carbonate (PC), butylene carbonate, vinylene carbonate, vinyl ethylene carbonate, and derivatives thereof. These may be used singly or in combination of two or more kinds. In view of the ion conductivity of the electrolyte liquid, preferred is at least one selected from the group consisting of ethylene carbonate, fluoroethylene carbonate, and propylene carbonate.

Examples of the chain carbonic ester include diethyl carbonate (DEC), ethyl methyl carbonate (EMC), and dimethyl carbonate (DMC).

Examples of the cyclic carboxylic acid ester include γ-butyrolactone (GBL) and γ-valerolactone (GVL).

Examples of the chain carboxylic acid ester include methyl acetate (MA), ethyl acetate (EA), propyl acetate, methyl propionate, ethyl propionate, and propyl propionate. These solvents may be used singly or in combination of two or more kinds.

Examples of the lithium salt include: $LiPF_6$, $LiBF_4$, $LiClO_4$, $LiAsF_6$, $LiCF_3SO_3$, $LiN(SO_2F)_2$, and $LiN(SO_2CF_3)_2$. These lithium salts may be used singly or in combination of two or more kinds.

EXAMPLES

A positive electrode material and a secondary battery according to the present disclosure will be specifically described below with reference to Examples and Comparative Examples. It is to be noted, however, that the positive electrode material and the secondary battery according to the present disclosure are not limited to the following Examples.

Example 1

A secondary battery for positive electrode evaluation was produced by the following procedures, with metal Li used as a counter electrode.

(1) Synthesis of First Lithium Oxide

Lithium oxide ($Li_2O$), nickel(I) oxide (NiO), and digallium trioxide ($Ga_2O_3$) were mixed in a predetermined molar ratio, and crushed in a ball mill in an Ar atmosphere. The crushed material was baked in a 650° C. Ar atmosphere, to obtain a first lithium oxide ($Li_2Ni_{0.97}Ga_{0.03}O_2$) containing Ga.

(2) Production of Positive Electrode

The first lithium oxide, acetylene black (AB) serving as an electrically conductive material, and polyvinylidene fluoride (PVdF) serving as a binder were mixed in a mass ratio of the first lithium oxide:AB:PVdF=100:1:0.9, to which N-methyl-2-pyrrolidone (NMP) was further added in an adequate amount and stirred, to prepare a positive electrode slurry. Next, the obtained positive electrode slurry was applied onto one surface of an aluminum foil (positive electrode current collector) and then dried. The dry applied film to serve as a positive electrode material layer was rolled between rollers.

A stack of the positive electrode current collector and the positive electrode material layer was cut in an electrode size, to form a positive electrode including the positive electrode current collector with the positive electrode material layer formed on one surface thereof.

(3) Preparation of Electrolyte

To 100 parts by mass of a mixture containing EC and EMC in a mass ratio of 1:3, 1 part by mass of vinylene carbonate was added, to give a non-aqueous solvent. $LiPF_6$ was dissolved in the non-aqueous solvent at a concentration 1.0 mol/L, to prepare a non-aqueous electrolyte.

(4) Fabrication of Battery

The positive electrode obtained above and a Li metal counter electrode were each attached with a lead wire. The positive electrode and the Li metal counter electrode were faced with each other, with a 0.015-mm-thick separator containing PP and PE interposed therebetween, to form an electrode body. The electrode body was enclosed, together with the non-aqueous electrolyte, in an outer case made of an aluminum laminated film. A secondary battery A1 was thus fabricated.

(5) Evaluation

Charging was performed at a constant current of 0.05 C until the closed-circuit voltage of the battery reached 4.3 V (vs. Li counter electrode), and subsequent charging was performed at a constant voltage of 4.3 V until the current value became less than 0.02 C, to determine an initial charge capacity $C_1$ of the battery.

Thereafter, discharging was performed at a constant current of 0.05 C until the closed-circuit voltage of the battery reached 2.5 V (vs. Li counter electrode), to determine a discharge capacity $C_2$. The evaluation was made, with $X=C_2/C_1$ taken as the initial efficiency. Here, the charging and the discharging were performed in a 25° C. environment.

Example 2

Lithium oxide ($Li_2O$), nickel(II) oxide (NiO), and lithium fluoride (LiF) were mixed in a predetermined molar ratio such that, with the number of Li atoms in the lithium oxide given as corresponding to 2 equivalents, the number of F atoms in the lithium fluoride was 0.1 equivalents. The resultant mixture was crushed in a ball mill in an Ar atmosphere. The crushed material was baked in a 650° C. Ar atmosphere, to obtain a first lithium oxide ($Li_2NiO_{1.9}F_{0.1}$) containing F.

The obtained first lithium oxide was analyzed for its surface composition by X-ray photoelectron spectroscopy (XPS). The result found that the F/Ni ratio was 0.67.

A secondary battery A2 was produced in the same manner as in Example 1, except the above.

Example 3

In Example 2, lithium fluoride was blended in an amount twice as much as that in Example 2, to synthesize a first lithium oxide containing F.

A secondary battery A3 was produced in the same manner as in Example 1, except the above.

Example 4

In Example 2, lithium fluoride was blended in an amount three times as much as that in Example 2, to synthesize a first lithium oxide containing F.

A secondary battery A4 was produced in the same manner as in Example 1, except the above.

Example 5

In Example 1. $Bi_2O_3$ was used in place of the gallium trioxide, to synthesize a first lithium oxide ($Li_2Ni_{0.97}Bi_{0.03}O_2$) containing Bi.

A secondary battery A5 was produced in the same manner as in Example 1, except the above.

Example 6

In Example 1, $Y_2O_3$ was used in place of the gallium trioxide, to synthesize a first lithium oxide ($Li_2Ni_{0.97}Y_{0.03}O_2$) containing Y.

A secondary battery A6 was produced in the same manner as in Example 1, except the above.

Example 7

In Example 1, CaO was used in place of the gallium trioxide, to synthesize a first lithium oxide ($Li_2Ni_{0.97}Ca_{0.03}O_2$) containing Ca.

A secondary battery A7 was produced in the same manner as in Example 1, except the above.

Example 8

The first lithium oxide ($Li_2NiO_{1.9}F_{0.1}$) obtained in Example 2 and $LiNi_{0.82}Co_{0.15}Al_{0.03}O_2$ used as the second lithium oxide were mixed such that the ratio of the first lithium oxide to the total of the first and second lithium oxides was 20 mass %, to give a mixture.

The mixture was mixed with acetylene black (AB) serving as an electrically conductive material, and polyvinylidene fluoride (PVdF) serving as a binder, to prepare a positive electrode slurry, with which a positive electrode was produced similarly to in Example 1.

A secondary battery A8 was produced in the same manner as in Example 1, except the above.

Comparative Example 1

Lithium oxide ($Li_2O$) and nickel(II) oxide (NiO) were mixed in a predetermined molar ratio, and crushed in a ball mill in an Ar atmosphere. The crushed material was baked in a 650° C. Ar atmosphere, to synthesize $Li_2NiO_2$.

A secondary battery B1 was produced in the same manner as in Example 1, except the above.

Comparative Example 2

$LiNi_{0.82}Co_{0.15}Al_{0.03}O_2$ used as the second lithium oxide, acetylene black (AB) serving as an electrically conductive material, and polyvinylidene fluoride (PVdF) serving as a binder in a mass ratio of the second lithium oxide:AB:PVdF=100:1:0.9, to which N-methyl-2-pyrrolidone (NMP) was further added in an adequate amount and stirred, to prepare a positive electrode slurry, with which a positive electrode was produced similarly to in Example 1.

A secondary battery B2 was produced in the same manner as in Example 1, except the above.

Comparative Example 3

$Li_2NiO_2$ obtained in Comparative Example 1 and $LiNi_{0.82}Co_{0.15}Al_{0.03}O_2$ used as the second lithium oxide were mixed such that the ratio of the first lithium oxide to the total of the first and second lithium oxides was 20 mass %, to give a mixture.

A secondary battery B3 was produced in the same manner as in Example 8, except the above.

Regarding Examples 1 and 2 and Comparative Example 1, the evaluation results of the initial charge capacity $C_1$, the discharge capacity $C_2$, and the initial efficiency are shown in Table 1.

TABLE 1

| Cell | Initial charge capacity $C_1$ (mAh/g) | Discharge capacity $C_2$ (mAh/g) | Initial efficiency $C_2/C_1$ (%) |
| --- | --- | --- | --- |
| A1 | 411.3 | 155.5 | 37.8 |
| A2 | 411.7 | 156.8 | 38.1 |
| B1 | 372.8 | 78.5 | 21 |

In the secondary battery A1 including $Li_2Ni_{0.97}Ga_{0.03}O_2$ as a positive electrode active material and the secondary battery A2 including $Li_2NiO_{1.9}F_{0.1}$ as a positive electrode material, the initial charge capacity was significantly improved, as compared to in the secondary battery B1 including $Li_2NiO_2$ as a positive electrode material. In the secondary batteries A1 and A2, the initial discharge capacity and the initial efficiency were both improved, as compared to in the secondary battery B1.

The first lithium oxides used in Examples 2 to 4 were subjected to X-ray diffractometry, in which a diffraction pattern of LiF was observed. Analysis of peak intensities showed that the aforementioned content R of LiF in Examples 2 and 3 was less than 1%, whereas the content R of LiF was 5% in Example 4.

The first lithium oxides used in Examples 1, 2 and 5 to 7, and $Li_2NiO_2$ used in Comparative Example 1 were subjected to X-ray diffractometry, and the crystallite size of each oxide was calculated from a diffraction peak corresponding to the (101) plane of the space group Immm. The results are shown in Table 2. Table 2 indicates that substituting the Ni site in $Li_2NiO_2$ by the element $A^1$ and/or the O site in $Li_2NiO_2$ by the element $A^2$ can make the crystalline size smaller than that of $Li_2NiO_2$.

TABLE 2

| Cell | First lithium oxide | Crystallite size (A) |
| --- | --- | --- |
| B1 | $Li_2NiO_2$ | 636.7 |
| A2 | $Li_2NiO_{1.9}F_{0.1}$ | 612.1 |
| A1 | $Li_2Ni_{0.97}Ga_{0.03}O_2$ | 619.2 |
| A5 | $Li_2Ni_{0.97}Bi_{0.03}O_2$ | 467.6 |
| A6 | $Li_2Ni_{0.97}Y_{0.03}O_2$ | 593.9 |
| A7 | $Li_2Ni_{0.97}Ca_{0.03}O_2$ | 558.0 |

Regarding Example 8 and Comparative Examples 2 and 3, the evaluation results of the initial charge capacity $C_1$ and a capacity retention ratio at the 2nd cycle are shown in Table 3. The capacity retention ratio at the 2nd cycle refers to a ratio of a discharge capacity at the 2nd cycle to the initial charge capacity $C_1$. Note that the charge and discharge conditions at the 2nd cycle were the same as those used for determining the initial charge capacity $C_1$ and the discharge capacity $C_2$.

TABLE 3

| Cell | Initial charge capacity $C_1$ (mAh/g) | Capacity retention ratio at 2nd cycle (%) |
| --- | --- | --- |
| A8 | 245.4 | 99.7 |
| B2 | 217.4 | 99.8 |
| B3 | 263.0 | 83.0 |

The secondary batteries A8 and B3 exhibited an initial charge capacity higher than that of the secondary battery B2. On the other hand, when comparing the capacity retention ratio at the 2nd cycle, the secondary battery B3 was inferior to B2, but A8 exhibited almost the same high value as that of B2. The secondary battery A8 showed an improvement in the initial charge capacity over the secondary battery B2, and an improvement in the capacity retention ratio at the 2nd cycle over the secondary battery B3.

Regarding Example 8, the secondary battery A8 was disassembled after charge and discharge, to take out the positive electrode active material. The positive electrode active material was subjected to X-ray diffractometry, from which a diffraction pattern corresponding to a mixture of the first lithium oxide and the second lithium oxide was obtained. The half width of the diffraction peak corresponding to the (101) plane of the first lithium oxide was 12.3 times as large as the half width of the highest intensity diffraction peak of the second lithium oxide.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

The positive electrode according to the present disclosure is useful as a positive electrode for secondary batteries used as a driving power source for personal computers, cellular phones, mobile devices, personal digital assistants (PDA), portable game machines, camcorders, and the like, a main or auxiliary driving power source for an electric motor in hybrid electric cars, plug-in HEVs, and the like, and a driving power source for electric power tools, vacuum cleaners, robots, and the like.

REFERENCE SIGNS LIST

1: secondary battery. 10: wound electrode group, 11: prismatic battery case, 12: sealing plate, 13: negative electrode terminal, 14: positive electrode lead, 15: negative electrode lead, 16: gasket. 17: sealing stopper, 17a: injection hole, 18: frame member

What is claimed is:

1. A positive electrode active material for secondary batteries, the positive electrode active material comprising:
a first lithium oxide represented by a composition formula (1): $Li_{2+x}Ni_{1-y}A^1_yO_{2-z}A^2_z$, where $-0.5 \leq x \leq 0.3$, $0 \leq y \leq 0.1$, and $0 \leq z \leq 0.3$,
at least one of y and z being not 0,
$A^1$ including at least one selected from the group consisting of Ba, Ca, W, and Ta, A² including at least one selected from the group consisting of halogen elements and S.

2. The positive electrode active material according to claim 1, wherein the A¹ further includes Ga.

3. The positive electrode active material according to claim 1, wherein the A² includes at least F.

4. The positive electrode active material according to claim 3, further comprising LiF.

5. The positive electrode active material according to claim 4, wherein the LiF is localized on a surface of the first lithium oxide.

6. The positive electrode active material according to claim 1, wherein
the first lithium oxide is mixed with a second lithium oxide represented by a composition formula (2): $Li_aM^1O_2$, where $0.95 \leq a \leq 1.2$,
M¹ including at least one selected from the group consisting of Ni, Mn, and Co.

7. The positive electrode active material according to claim 6, wherein
the second lithium oxide is represented by a composition formula (2a): $Li_aNi_bCo_cM^2_{1-b-c}O_2$, where $0.95 \leq a \leq 1.2$, $0.3 \leq b \leq 0.95$, $0 < c \leq 0.5$, and $b+c<1$,
M² including at least one selected from the group consisting of Mn and Al.

8. The positive electrode active material according to claim 7, wherein the first lithium oxide is contained in a proportion of 1 to 20 mass % in the positive electrode active material as a whole.

9. A secondary battery, comprising:
a positive electrode, a negative electrode, and an electrolyte,
the positive electrode including the positive electrode active material according to claim 1.

10. The secondary battery according to claim 9, wherein
the negative electrode includes a negative electrode active material, and
the negative electrode active material includes an alloy-type material containing at least one element selected from the group consisting of Si, Sn, Ga, and In.

11. The secondary battery according to claim 9, wherein the positive electrode includes an amorphous phase mainly composed of $Li_{1+x}Ni_{1-y}A^1_yO_{2-z}A^2_z$ wherein a half width w of a diffraction peak corresponding to the (101) plane of the first lithium oxide obtained by X-ray diffractometry satisfies $w>0.5°$.

12. A positive electrode active material for secondary batteries, the positive electrode active material comprising:
a first lithium oxide represented by a composition formula (1): $Li_{2+x}Ni_{1-y}A^1_yO_{2-z}A^2_z$, where $-0.5 \leq x \leq 0.3$, $0 \leq y \leq 0.1$, and $0 < z \leq 0.3$,
A¹ including at least one selected from the group consisting of Ga, Bi, Ba, Y, Sn, Ca, W, and Ta,
A² including at least one selected from the group consisting of halogen elements and S,
wherein the first lithium oxide has a crystal structure belonging to a space group Immm.

* * * * *